Aug. 25, 1936.    J. W. LOGAN, JR    2,052,203
BRAKE RETARDATION CONTROLLER
Filed Dec. 9, 1933
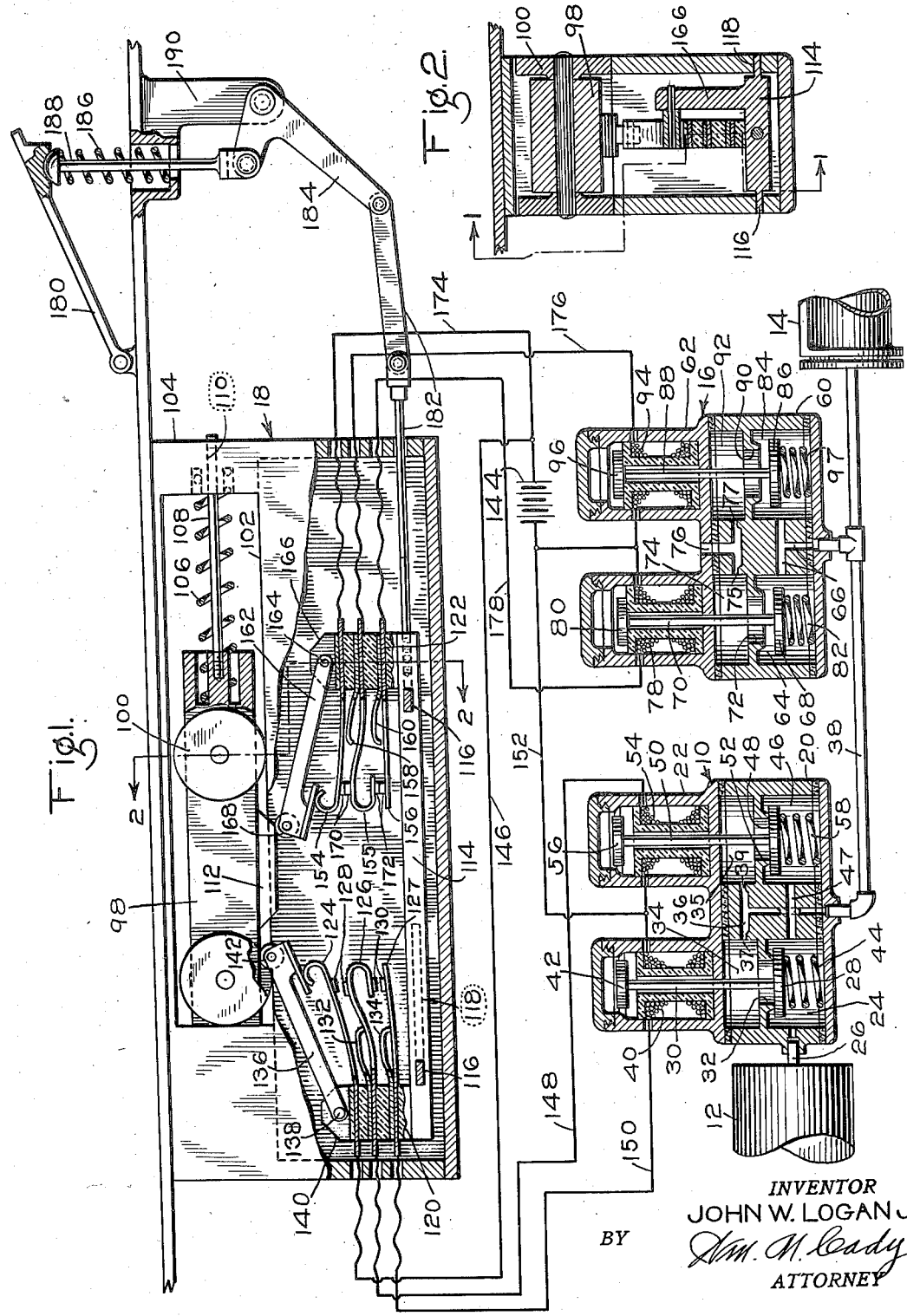
INVENTOR
JOHN W. LOGAN JR.
BY
*Wm. N. Cady*
ATTORNEY Patented Aug. 25, 1936

2,052,203

UNITED STATES PATENT OFFICE 2,052,203

BRAKE RETARDATION CONTROLLER

John W. Logan, Jr., Wilkinsburg, Pa., assignor to The Westinghouse Air Brake Company, Wilmerding, Pa., a corporation of Pennsylvania Application December 9, 1933, Serial No. 701,647

17 Claims. (Cl. 303—24)

This invention relates to vehicle brakes, and more particularly to brake retardation controller apparatus for effecting a graduated application and a graduated release of the brakes in accordance with a preselected rate of retardation.

In vehicles employing friction type brakes, it is well known that for a given braking pressure such brakes are less effective in retarding motion of a vehicle at high speeds than at low speeds, due to the coefficient of friction between the rubbing parts being lower at high speeds than at low speeds. In order to bring a vehicle to a stop quickly it has been the usual practice for an operator to apply the brakes with a high degree of braking pressure at the high speeds and as the speed of the vehicle diminishes the operator causes the braking pressure to be diminished in such a way that the vehicle is brought to a stop quickly and smoothly without dangerous shock, or skidding of the wheels. It has heretofore been proposed to accomplish this varying of the braking pressure automatically by providing retardation controller apparatus for varying the braking pressure in accordance with a preselected rate of retardation. When a retardation rate controller is employed, if the braking force be varied too suddenly by operation of the controller, the change in the rate of retardation thus produced is liable to be excessive and greater than necessary to prevent skidding of the wheels. The principal object of my invention is to provide braking pressure controlling means which is responsive to the retardation controller to gradually vary the braking pressure and thus provide a more uniform rate of retardation, with the avoidance of abrupt changes in the rate of retardation.

Another object is to provide a brake retardation controller apparatus in which manually positionable contacts are actuated by an inertia operated body to effect the graduated application and graduated release of the brakes as heretofore referred to.

Another object is to provide an apparatus of this character in which a desired rate of retardation may be preselected manually by manipulation of a control element, and the preselected rate of retardation automatically maintained thereafter in accordance with the positioning of said control element.

Another object is to provide a control apparatus for controlling fluid under pressure supplied to operate the brakes, in which the operation of a control element to preselect a desired rate of retardation effects a supply of fluid under pressure to the brakes at a maximum rate, and which rate is thereafter automatically varied to maintain the preselected rate of retardation, or any other rate subsequently selected.

Other objects and advantages of my invention will be apparent from the following description, which is taken in connection with the attached drawing, in which, Fig. 1 is a schematic, and somewhat diagrammatic, arrangement of one embodiment of my invention.

Fig. 2 is a view along the line 2—2 of the retardation controller device itself, as shown in Fig. 1.

Referring now to the drawing, the embodiment there illustrated comprises an electrically operated supply valve device 10, for controlling the supply of fluid under pressure to a brake cylinder 14, and an electrically operated release valve device 16, for controlling the release of fluid under pressure from the brake cylinder 14; and a retardation controller device 18 for controlling the operation of the valve devices 10 and 16.

The electrically operated supply valve device 10 comprises a valve section 20 and a magnet section 22. The valve section 20 comprises a casing defining valve chambers 24 and 46, and brake cylinder supply chambers 34 and 35. The valve chamber 24 is in constant communication with a reservoir 12 by pipe 26, and has disposed therein a valve 28, secured to one end of a stem 30 and cooperating with a valve seat 32 to control the supply of fluid under pressure from the reservoir 12 to the brake cylinder supply chamber 34 and thence to the brake cylinder 14 by way of passage 36 and pipe 38. The passage 36 is provided with a restricted portion 37, to limit the rate at which fluid under pressure is supplied to the brake cylinder. The valve chamber 46, is in constant communication with the valve chamber 24, and hence the reservoir 12, by passage 47, and has disposed therein valve 48, secured to one end of a stem 50 and cooperating with valve seat 52 to control the supply of fluid under pressure from the reservoir 12 to the brake cylinder supply chamber 35, and thence to the brake cylinder 14 by way of passage 36 and pipe 38. Passage 36 is also provided with another restricted portion 39, to also limit the rate at which fluid may be supplied to the brake cylinder.

The magnet section 22 is provided with an electromagnet having winding 40 which when energized is adapted to attract theretoward armature 42 secured to the other end of the valve stem 30, to unseat the valve 28, which is normally held seated by spring 44. The magnet section is also provided with another electromagnet having winding 54, which when energized is adapted to attract theretoward armature 56 secured to the other end of valve stem 50, to unseat valve 48, which is normally held seated by spring 58. When one of the valves 28 and 48 is unseated and the other is seated, fluid will be supplied to the brake cylinder 14 at one rate, and when both valves are unseated fluid will be supplied to the brake cylinder at a greater rate.

The electrically operated release valve device 16 comprises a valve section 60 and a magnet section 62. The valve section 60 comprises a casing defining valve chambers 64 and 84, and brake cylinder venting chambers 74 and 92. The valve chambers 64 and 84 are in constant communication with the brake cylinder 14 by passage 66 and pipe 38. Disposed in the valve chamber 64 is a valve 68, secured to one end of a stem 70 and adapted to cooperate with a valve seat 72 to control the flow of fluid under pressure from the valve chamber 64 to the release chamber 74 and thence to the atmosphere by way of passage 76. Passage 76 is provided with a restricted portion 75, to restrict the rate of flow of the fluid from the brake cylinder to the atmosphere. The valve chamber 84 has disposed therein a valve 86, secured to one end of a stem 88 and adapted to cooperate with a valve seat 90 to control the flow of fluid from the chamber 84 to the release chamber 92, and thence to the atmosphere by way of passage 76. Passage 76 is also provided with another restricted portion 77, to also restrict the flow of fluid to the atmosphere.

The magnet section 62 comprises an electromagnet having winding 78, adapted when energized to attract theretoward armature 80 secured to the other end of valve stem 70, to unseat valve 68, which is urged to its seat by spring 82. The magnet section is also provided with an electromagnet having winding 94, which when energized is adapted to attract theretoward armature 96 secured to the other end of valve stem 88, to unseat valve 86, which is urged to its seat by spring 97. When one of the valves 68 and 86 is seated and the other is unseated, fluid will be released from the brake cylinder at one rate, and when both of the valves are unseated fluid will be released from the brake cylinder at a greater rate.

The retardation controller device 18 is provided with an inertia operated body 98 having wheels 100 and adapted to be moved by force of inertia in a trackway 102 of a supporting frame 104, against resistance of a spring 106 normally urging the body 98 to a biased position to the left. Movement of the body 98 is also guided by action of a rod or plunger 108 interfitting with a bore 110 in the frame 104. Projecting downwardly from the body 98 is a cam 112, adapted to engage and operate contact controlling means as will now be described.

Supported on a slidable member 114 having tongues 116 projecting into and slidable in slots 118 in the housing 104, are two groups of contacts 120 and 122. The contact group 120 is provided for controlling the operation of the supply valve device 10, and contact group 122 is provided for controlling operation of the release valve device 16, as will hereinafter appear. The contact group 120 comprises spring elements 124, 126 and 127, carrying pairs of contacts 128 and 130, as shown. The spring element 126 has associated therewith an element 132 for limiting the upward movement thereof, and similarly, the spring element 127 has associated therewith an element 134 for a like purpose, so that the contacts 128 and 130 are normally held open by the spring elements.

Spring elements 124, 126 and 127 are insulated from each other and from the supporting member 114, as indicated in Fig. 1. For operating these spring elements to close contacts 128 and 130 there is provided an arm 136, having one end thereof pivotally secured at 138 to a lug 140 integral with the member 114, and having a roller 142 rotatably secured in the other end thereof adapted to engage the under surface of the body 98 and the cam element 112 associated therewith. As is obvious from the illustration in Fig. 1, the arm 136 permits the pairs of contacts 128 and 130 to be opened by action of the spring elements when the roller 142 is out of engagement with the cam 112, but as the roller 142 engages the sloping part of the cam 112, the arm 136 will be forced downwardly to cause contacts 128 to close first, and as the roller 142 rolls onto the high part of cam 112, to cause contacts 130 to close subsequently. The spring element 124 is connected to one terminal of a battery 144 by conductor 146, and the spring element 126 is connected to one terminal of the electromagnet winding 54 by conductor 148, while the spring element 127 is connected to one terminal of the electromagnet winding 40 by conductor 150. The other terminals of the windings 40 and 54 are connected to the battery 144 by conductor 152, as shown, so that contacts 128 control the seating and unseating of valve 48 and contacts 130 control the seating and unseating of valve 28.

The contact group 122 is similar to the group 120 and is provided with similar spring elements 154, 155 and 156, carrying pairs of contacts 170 and 172. Associated with the spring element 155 is a member 158 for limiting the upward movement of the spring element 155, and similarly there is associated with the spring element 156 a like member 160 for a similar purpose, so that contacts 170 and 172 are normally held open by the spring elements. The spring elements 154, 155 and 156 are insulated from each other and from the supporting member 114. An arm 162 is pivotally mounted at one end at 164 to a lug 166 integral with the member 114, and is provided with a roller 168 rotatably secured in the other end thereof adapted to engage the cam 112 to actuate the spring elements 154, 155 and 156, to close the pairs of contacts 170 and 172. When the roller 168 is out of engagement with the cam 112, contacts 170 and 172 will be open, but as the roller engages the sloping part of the cam contacts 170 are first closed and subsequently as the roller engages the high part of the cam contacts 172 are closed.

It is to be understood that the slope of the cam 112 is such that when roller 142 is just rolling onto the sloping part of the cam at one end, roller 168 is just rolling off the sloping part of the cam at the other end. At this instant then all of the contacts in both groups 120 and 122 will be open.

Spring element 154 is connected to one terminal of the battery 144 by conductor 174. Spring element 155 is connected to one terminal of the electromagnet winding 94 by conductor 176, and spring element 156 is connected to one terminal of the electromagnet winding 78 by conductor 178. The other terminals of the windings 78 and 94 are connected to the other terminal of the battery 144, so that contacts 170 control the seating and unseating of valve 86, and contacts 172 control the seating and unseating of valve 68.

For moving the slidable member 114, and for thus positioning at will the contact groups 120 and 122 with respect to the inertia operated body 98, there is provided a foot pedal mechanism having a foot pedal 180 adapted to move the member 114 back and forth, through link members 182 and a bell crank lever 184, against resistance of a spring 186, concentrically disposed on a pin bolt 188 intervening between the foot pedal 180 and the bell crank lever 184. The bell crank lever 184 may be pivotally supported by a bracket 190, as shown.

The operation of the embodiment hereinbefore described, in connection with the braking of a vehicle, is as follows: When the vehicle is traveling at a constant rate of speed and the foot pedal 180 is in its uppermost position, the body 98 will be held in its extreme left position, as viewed in Fig. 1, by action of spring 106. Similarly, the slidable member 114 will also be positioned in its extreme left position by action of spring 186 on the bell crank lever 184, thus positioning the contact groups 120 and 122 so that roller 142 is out of engagement with cam 112 and roller 168 is in engagement with cam 112. Contacts 128 and 130 will thus be opened, and windings 40 and 54 will be deenergized, thus permitting springs 44 and 58 to seat valves 28 and 48. The supply of fluid under pressure from the reservoir 12 to the brake cylinder 14 will, therefore, be cut off. The roller 168 will be in engagement with the high part of the cam 112, thus causing contacts 170 and 172 to be closed, and windings 78 and 94 will therefore be energized, whereupon valves 68 and 86 will be unseated, thereby venting the brake cylinder 14 to the atmosphere. The brakes are thus held in released position.

When it is desired to effect an application of the brakes, the foot pedal 180 is depressed an amount in accordance with the desired rate of retardation to be maintained. The pressing of the foot pedal moves the slidable member 114 to the right, whereupon, assuming that the member 114 is moved a sufficient distance to cause roller 168 to move entirely out of engagement with the cam 112, and that roller 142 is moved into engagement with the high part of the cam 112, contacts 170 and 172 will be opened, and contacts 128 and 130 will be closed. Opening of contacts 170 and 172 deenergizes the magnet windings 78 and 94, whereupon the release valves 68 and 86 are seated, thereby cutting off the venting of the brake cylinder 14. Closing of the contacts 128 and 130 energizes the magnet windings 40 and 54, thereby unseating the supply valves 28 and 48, whereupon fluid under pressure flows from the reservoir 12 past the unseated supply valves to brake cylinder 14 by way of passage 36 and pipe 38 at the maximum rate. As the brake cylinder pressure increases the rate of retardation increases acccordingly.

When the vehicle begins to decelerate the force of inertia will cause the body 98 to move to the right against resistance of the spring 106. As the body 98 moves to the right, roller 142 will roll down the sloping part of the cam 112 at the left, and as it does so contacts 130 will be opened, thereby deenergizing the magnet winding 40 and thus permitting the supply valve 28 to be seated by spring 44. The rate of supply of fluid to the brake cylinder 14 will therefore be reduced.

If the body 98 continues to move to the right,
roller 142 rolls off the sloping part of the cam 112 at the left, and as it just does so contacts 128 are also opened. Magnet winding 54 will be thereby deenergized, supply valve 48 will be seated by spring 58, and the supply of fluid under pressure to the brake cylinder will be wholly cut off. Since at the time roller 142 is rolling off the sloping part of the cam at the left, roller 168 is just engaging, but has not begun to roll up, the sloping part at the right, both release valves 68 and 86 will be seated and the supply of fluid to the brake cylinder will be lapped.

Now if for this lap condition of the brake cylinder the rate of retardation is or becomes greater than that desired, the body 98 will move still further to the right. As it does so roller 168 rolls up the sloping part of the cam 112 at the right, thereby closing contacts 170 and energizing magnet winding 94 to unseat release valve 86. Fluid pressure in the brake cylinder will be released to the atmosphere at a reduced rate and the braking force will decrease accordingly.

If release of fluid pressure from the brake cylinder at this rate is not great enough to reduce the rate of retardation to the desired rate, the body 98 moves still further to the right. The roller 168 then rolls onto the high part of cam 112 and contacts 172 are thereby closed. Closing of contacts 172 energizes magnet winding 78 to unseat release valve 68, thereby releasing fluid pressure in the brake cylinder to the atmosphere at the maximum rate. The braking force will therefore be further decreased and the rate of retardation will decrease.

As the rate of retardation decreases, the body 98 moves to the left. As it does so the release valves 68 and 86 are closed successively, due to opening of contacts 172 and 170, respectively. If after these valves are seated there is not sufficient fluid pressure in the brake cylinder to maintain the selected rate of retardation, the body 98 will move further to the left. This movement will first close contacts 128 to unseat supply valve 48, to supply fluid under pressure to the brake cylinder at a reduced rate, and if this rate is insufficient to produce the desired retardation, then the body 98 moves still further to the left, whereupon supply valve 28 is unseated and fluid under pressure is supplied to the brake cylinder at the maximum rate. As the pressure in the brake cylinder increases and the rate of retardation increases, the body 98 will again move through all or as much of the cycle just described as is necessary to maintain the rate of retardation selected by depressing the foot pedal.

Practically, however, when the brakes are applied by depressing the foot pedal, and as the vehicle begins to decelerate, the body 98 moves to the position where the fluid supplied to the brake cylinder is lapped. As the speed of the vehicle diminishes the rate of retardation increases, due to the increase of coefficient of friction between the rubbing parts, so that the braking force must be diminished. The body 98 accomplishes this by moving to the right and releasing fluid pressure from the brake cylinder, first at one rate and then at a greater rate, as described.

It will thus be obvious that for any preselected rate of retardation, as by depressing foot pedal 180 the desired amount, the body 98 will move back and forth, according to the rate of retardation of the vehicle, to operate contact groups 120 and 122 to graduate the rate of supply of fluid under pressure to and the rate of release of fluid under pressure from the brake cylinder, so that a more uniform rate of retardation may be automatically maintained. While I have shown only two supply valve devices and two release valve devices, it will be obvious that, if desired, a greater number of each may be used.

If at any time after selecting a desired rate of retardation, the operator desires to select a different rate, he may do so by varying the amount that the foot pedal has been depressed. Since the matter of automatically controlling the application of the brakes is dependent upon the relative position of the contact groups 120 and 122 with respect to the body 98, the operator has at all times within his control the degree of application of the brakes, and this control is effected by the simple manipulation of the foot pedal.

While one embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, the combination with means for applying the brakes, of an inertia device operable manually and by the rate of retardation of the vehicle, and means governed by manual operation of said device for effecting an application of the brakes first at one rate and then at another rate.

2. In a vehicle brake apparatus, the combination with means for applying and releasing the brakes, of an inertia device operable manually and by the rate of retardation of the vehicle, and means governed by operation of said device due to the rate of retardation for effecting a release of the brakes at first one rate and then at another rate.

3. In a vehicle brake apparatus, in combination, brake means, a control device having an element movable at will and a second element movable according to the rate of retardation of the vehicle, means responsive to movement of said first element for effecting an application of said brake means first at one rate and then at another rate, and means responsive to movement of said second element for effecting a release of said brake means first at one rate and then at another rate.

4. In a vehicle brake system, in combination, a brake cylinder, a control device having an element movable at will and a second element movable according to the rate of retardation of the vehicle, a plurality of normally open contacts, means responsive to movement of said first element for sequentially closing said contacts and responsive to subsequent movement of said second element for sequentially opening said contacts, and a plurality of electrically operated valve devices operable upon closing of said contacts to supply fluid under pressure to said brake cylinder first at one rate and then at another rate and operable upon opening of said contacts to release fluid under pressure from said brake cylinder first at one rate and then at another rate.

5. In a vehicle brake system, in combination, a brake cylinder, a control device having an element movable at will and a second element movable according to the rate of retardation of the vehicle, a plurality of normally closed contacts, means responsive to movement of said first element for sequentially opening said contacts and responsive to subsequent movement of said second element for sequentially closing said contacts, and a plurality of electrically operated valve devices controlling a plurality of restricted communications through which fluid under pressure is released from said brake cylinder and operable to close all of said communications when said contacts are opened and to successively open said communications when said contacts are sequentially closed.

6. In a vehicle brake system, in combination, a brake cylinder, a plurality of supply magnet valve devices controlling a plurality of restricted communications through which fluid under pressure is supplied to said brake cylinder, a plurality of release magnet valve devices controlling a plurality of restricted communications through which fluid under pressure is released from said brake cylinder, a retardation controller device having a manually movable element and an inertia operated element movable according to the rate of retardation of the vehicle, a plurality of supply contacts controlling said supply magnet valve devices and a plurality of release contacts controlling said release magnet valve devices, means responsive to movement of said manually movable element for sequentially operating said release contacts and for then sequentially operating said supply contacts and responsive to subsequent movement of said inertia operated element for reversing this operation of said contacts.

7. In a vehicle brake system, the combination with an inertia operated member, of a slidable member, and means whereby a movement of said slidable member effects an application of the brakes with a maximum rate of increase of braking force and movement of said inertia operated member subsequently reduces said rate.

8. In a vehicle brake apparatus, the combination with a brake cylinder, of a device operable by the rate of retardation of the vehicle, and means controlled by said device for supplying fluid under pressure to the brake cylinder first at one rate and then at another rate.

9. In a vehicle brake system, the combination with a brake cylinder, of a magnet valve device controlling the supply of fluid under pressure to said brake cylinder, a manually movable member, contacts carried by said member for controlling operation of said magnet valve device, an inertia operated body, said inertia operated body and manually movable member having biased positions in which said contacts are open, means whereby movement of said manually movable member effects closing of said contacts to energize said magnet valve device to supply fluid under pressure to said brake cylinder, and means whereby subsequent movement of said inertia operated body effects opening of said contacts to lap said supply to said brake cylinder.

10. In a vehicle brake system, the combination with electro-responsive means for controlling applications and release of the brakes, of a manually movable member, normally open contacts carried by said member for controlling applications of the brakes, normally closed contacts carried by said member for controlling release of the brakes, an inertia operated body, means whereby movement of said manually operated body effects closing of said normally open contacts and opening of said normally closed contacts, and means whereby subsequent movement of said inertia operated body opens said normally open contacts and closes said normally closed contacts.

11. In a vehicle brake system, the combination with a brake cylinder and a plurality of supply magnet valve devices and a plurality of release magnet valve devices for controlling the supply of fluid under pressure to and its release from said brake cylinder, of a manually movable member, a plurality of supply contacts and a plurality of release contacts carried by said manually movable member for controlling respectively said supply and release magnet valve devices, an inertia operated body adapted to operate said contacts, said inertia operated body and manually movable body having biased positions in which said supply contacts are open and said release contacts are closed, means whereby movement of said manually movable body with respect to said inertia operated body effects closing of said supply contacts and opening of said release contacts sequentially, and means whereby subsequent movement of said inertia operated body with respect to said manually movable body effects opening of said supply contacts and closing of said release contacts sequentially.

12. In a vehicle brake system, the combination with a brake cylinder, of a plurality of supply magnet valve devices and a plurality of release magnet valve devices controlling the supply of fluid under pressure to and its release from said brake cylinder, normally open contacts controlling energization of said supply magnet valve devices, normally closed contacts controlling energization of said release magnet valve devices, an inertia operated body for operating said contacts, means for manually actuating said contacts whereby to effect energization of said supply magnet valve devices and to effect deenergization of said release magnet valve devices, and means whereby subsequent movement of said inertia operated body effects operation of said contacts to first deenergize said supply magnet valve devices and to then energize said release magnet valve devices.

13. In a vehicle brake system, the combination with a plurality of magnet valve devices, of a manually movable member, a plurality of normally open contacts carried by said member, a plurality of normally closed contacts carried by said member, an inertia operated body for operating said contacts, means whereby movement of said manually movable member with respect to said inertia operated body effects closing of said normally open contacts sequentially to sequentially energize certain of said magnet valve devices and to effect opening of said normally closed contacts sequentially to sequentially deenergize certain other of said magnet valve devices.

14. In a vehicle brake system, the combination with a brake cylinder, of a magnet valve device for controlling a communication through which fluid under pressure is released from said brake cylinder, a manually movable member, contacts carried by said member for controlling operation of said magnet valve device, an inertia operated body, said inertia operated body and manually movable member having biased positions in which said contacts are closed, means whereby movement of said manually movable member effects opening of said contacts to deenergize said magnet valve device to close said release communication, and means whereby subsequent movement of said inertia operated body effects closing of said contacts to energize said magnet valve device to open said release communication.

15. In a vehicle brake system, in combination, a brake cylinder, a plurality of supply magnet valve devices operable to supply fluid under pressure to said brake cylinder first at one rate and then at another rate, a plurality of release magnet valve devices operable to release fluid under pressure from said brake cylinder first at one rate and then at another rate, a plurality of supply contacts controlling said supply magnet valve devices, a plurality of release contacts controlling said release magnet valve devices, and an inertia operated body having an element movable between said two sets of contacts and adapted to operate one set of contacts only after operation of the other set of contacts.

16. In a retardation controller device, in combination, a slidably movable member, a first set of contacts and a second set of contacts carried by said member, an inertia operated body, said inertia operated body and movable member having biased positions in which the contacts of said first set are open and the contacts of said second set are closed, a control element, means for actuating said movable member a distance in accordance with the degree of movement of said control element, and an actuating element carried by said inertia operated body and operable upon said movement of said movable member to close said open contacts and to open said closed contacts and operable subsequently by said body to a position in which the contacts of both of said sets are open.

17. In a retardation controller device, in combination, a slidably movable member, a first set and a second set of contacts carried by said member, an inertia operated body, an element carried by said inertia operated body and movable between said two sets of contacts for operating first one set and then the other set, means for actuating said movable member to a position where said element opens one set of contacts and closes the other set of contacts, and means whereby subsequent movement of said inertia operated body reverses this operation of the contacts.

JOHN W. LOGAN, Jr.